United States Patent Office 3,413,255
Patented Nov. 26, 1968

3,413,255

PIGMENTED COMPOSITIONS

John L. Gardon, Cheltenham, Michael Kalandiak, Ambler, and La Verne N. Bauer, Cheltenham, Pa., assignors to Rohm & Haas Company, Philadelphia, Pa., a corporation of Delaware No Drawing. Filed Oct. 31, 1963, Ser. No. 320,550
6 Claims. (Cl. 260—33.6)

ABSTRACT OF THE DISCLOSURE

This invention is concerned with pigmented polymer dispersions in a hydrocarbon or halogenated hydrocarbon medium in which there is present a dispersing agent for the pigment formed of an oil-soluble copolymer containing 2 to 15% of an unsaturated acid or anhydride.

The present invention is concerned with polymer compositions of lacquer or enamel type. It is particularly concerned with the providing in pigmented polymer solutions or dispersions of an improved dispersing agent for the pigment.

In pigmenting polymer solutions or dispersions within organic solvent media, and especially in hydrocarbon or halogenated hydrocarbon media, it has been found quite difficult to obtain thoroughly uniform dispersion of the pigment which would be stable and lasting in effect. Many of the known pigment dispersants, when attempts have been made to employ them in this type of organic solvent medium, have been so inefficient that after standing a very short period of time the pigmented compositions deposit the pigment at the bottom of the container in a form of mass or cake which, in many instances, is difficult to redisperse even with extensive agitation. In addition, in this type of system in which the polymer is dispersed as insoluble particles, many of the conventional pigment dispersants tend to flocculate or coagulate the dispersed polymer so that it is not only the pigment that is deposited at the bottom of the container, but a mixture of pigment and polymer which frequently is even more difficult to redisperse or resuspend than the former.

In accordance with the present invention, pigmented polymer compositions in which the polymer is dissolved or suspended as insoluble particles within a hydrocarbon or halogenated hydrocarbon medium have been greatly improved by incorporating as a dispersant for the pigment an oil-soluble high molecular weight polymer of an organic acid or anhydride. The polymeric pigment dispersant of the present invention may have a molecular weight from about 5,000 to about a million, and is preferably about 50,000 to 500,000 viscosity average. The copolymer contains from 2 to 15% of units derived from monoethylenically unsaturated acids or acid anhydrides such as acrylic acid, meth-acrylic acid, itaconic acid, aconitic acid, maleic acid, fumaric acid, and anhydrides of such acids. Preferred dispersants are those containing about 5 to 10% by weight of maleic or fumaric anhydrides in the polymer. The polymeric pigmented dispersant comprises besides the acid or anhydride units, units of any other essentially neutral monomer and, of course, it must contain sufficient of units imparting solubility in the hydrocarbon or halogenated hydrocarbon media to assure that the dispersant can be dissolved within the medium at sufficient level to operatively disperse the pigment. Generally, the proportion of dispersant needed is from about 2 to 15% by weight, based on the weight of the pigment. Examples of other monomers that can be copolymerized with the acid or anhydride include vinyl esters of aliphatic acids having from 2 to 18 carbons such as vinyl acetate, vinyl octoate, vinyl laurate, vinyl oleate, and stearate; vinyl aromatic hydrocarbons such as styrene, vinyltoluene, α-methyl styrene, and other homologous-substituted styrenes, vinyl chloride, vinylidene chloride, unsaturated hydrocarbons such as ethylene, isobutylene, butadienes, acrylonitrile, methacrylonitrile, acrylamide, methacrylamide, N-vinylpyrrolidinone, N-alkyl-substituted acrylamide or corresponding substituted methacrylamide in which the alkyl group has been from 1 to 18 carbon atoms and of which both hydrogens of the amide hydrogen can be replaced with such alkyl groups. Preferred comonomers include the esters of the formula

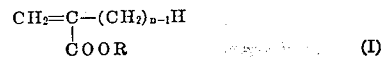

$$CH_2{=}\underset{\displaystyle COOR}{C}-(CH_2)_{n-1}H \qquad (I)$$

where $n$ is an integer having a value of 1 to 3, and

R is a $(C_1-C_{18})$-alkyl group.

When using the latter preferred comonomers, the copolymer contains sufficient groups R of sufficient size to render the copolymer soluble in liquid hydrocarbon media in which the copolymer is to function in dispersing the pigment. The size of the R groups and/or the proportion of large-sized R groups varies with the particular acid or anhydride with which the ester is copolymerized as well as with any other comonomers that may be present. In general, when the entire balance of the copolymer, except for the acid or anhydride, is formed of one or more esters of the formula above, as much as 50% by weight of the ester content may be formed of butyl esters provided the remaining ester content is formed with alcohols having at least 12 carbon atoms. Again, when the copolymer consists exclusively of the acid or anhydride and esters of the formula above, the copolymer may contain a proportion of methyl ester monomers as high as 20% of the total ester content when remainder of the ester monomers are formed from alcohols having at least 12 carbon atoms. Preferred copolymers are those of the acid or anhydride with esters of the formula above, all of which have at least 4 carbon atoms in the alcohol portion thereof.

While solubility is also imparted by vinyl esters of long-chain fatty acids by hydrocarbon monomers, and, of course, any mixture of the acrylate esters of alcohols having at least 4 carbon atoms with the long-chain acid esters of vinyl alcohol and/or with the hydrocarbon monomers may be used to get the needed oil-solubility, as stated, preferred copolymers are those which contain acrylic or methacrylic acid esters, and in order to provide adequate solubility they must contain a substantial content of the alkyl acrylate or alkyl methacrylate ester in which the alkyl group has at least 4 carbon atoms. Examples of other acrylates or methacrylates include hexyl, heptyl, dodecyl, myristyl, octyl or stearyl acrylate or methacrylate or mixtures thereof. When the copolymer contains large proportions of an alkyl acrylate or methacrylate of the formula above in which R has 12 or more carbon atoms, the copolymer is generally soluble in all of the hydrocarbon liquid media commonly employed for making the non-aqueous ploymer dispersions mentioned hereinabove.

The copolymers of the acid or anhydride may be prepared in any conventional type of solution polymerization procedure and the copolymer may be a simple copolymer obtained by mixing all of the monomers to be copolymerized in the proportions desired to provide the appropriate relative proportions of the several components in the copolymer. On the other hand, the solution polymerization may be varied by providing for the gradual addition of one or more of the monomers such as the acid or anhydride to the polymerization product of part or all of the remaining monomers to be copolymerized so that, in effect, one or more monomers, such as the acid or anhydride, are grafted onto an oil-soluble polymeric backbone.

The pigmented paste of the present invention may be used for pigmenting any polymer composition in which a polymer is either dissolved in a hydrocarbon or halogenated hydrocarbon medium, or is dispersed in the form of insoluble particles such as of 0.02 to 0.5 micron in average particle size within such medium. Besides employing the pigment paste in making pigmented lacquers in which the main film-forming polymer is dissolved, the paste may be used for pigmenting what may be termed a "non-aqueous dispersion" of the types disclosed in United States Patents 3,232,903, 3,198,759, 3,258,438, and 3,095,388; Canadian Patent 635,683; and French Patent 1,303,693.

In preparing the pigmented paste in a hydrocarbon or halogenated hydrocarbon medium, such as chloroform, methylene chloride, carbon tetrachloride, ethylene dichloride, trichloroethylene, and perchloroethylene, the paste is preferably made up at a relatively high concentration of pigment relative to the solvent, so that the solids concentration of the paste obtained would be about 40 to 80% by weight. However, if desired, this paste may be diluted to concentrations of from 10 to 30%, or even lower or higher, before incorporating the resulting pigment dispersion into the main polymer coating composition.

In order to prepare the pigment paste to be added to a non-aqueous medium, the polymeric dispersing agent as defined hereinabove is mixed with the hydrocarbon solvent, preferably but not necessarily using the same hydrocarbon as that in any medium with which it is intended that the resulting pigment paste or dispersion should be mixed, or using instead another hydrocarbon solvent miscible or compatible with that in the composition with which the pigment paste or dispersion prepared is to be mixed later. Such initial solution may contain about 1 to 5% by weight of the polymeric dispersing agent in the hydrocarbon solvent. The pigment is added to the dispersing agent solution while stirring, agitating or grinding in suitable equipment. The amount of pigment introduced may be from 1% to 225% by weight, based on the weight of solvent. For most purposes, the amount of pigment in the initial dispersion or paste so prepared is usually from 50 to 225% by weight, based on the weight of solvent, so that when such dispersion or paste is mixed with some other non-aqueous medium to be pigmented, severe dilution of the latter system is avoided. The mixture of pigment in the solution of the dispersing agent is then put through suitable homogenizing equipment to distribute the pigment and/or thoroughly wet the surface of the pigment particles. A typical type of equipment for this purpose is that which is well known as a Waring Blendor.

The pigment paste or dispersion thus obtained may be diluted if desired with a suitable hydrocarbon or chlorinated hydrocarbon solvent before mixing into the non-aqueous dispersion with which it is to be used. Alternatively, the homogenized dispersion of pigment or paste in the hydrocarbon solvent solution of the dispersing agent may be mixed directly with the non-aqueous composition which is to be pigmented, the manner of mixing being such as to avoid flocculation. Depending on the particular system, this mixing step may involve a gradual addition or sudden mixing.

The dispersing agents of the present invention may be used for dispersing all sorts of pigments including inorganic pigments such as, chrome yellows, Prussian blues and Brunswick greens, titanium pigments such as titanium dioxide, extended titanium pigments (extended with either precipitated or natural extenders, such as alkali earth sulphates for instance calcium sulphate, barium sulphate and the like), tinted titanium pigments, titanates such as barium, zinc, lead, magnesium titanates, and the like. Additionally, other types of inorganic pigments might be included, such as zinc sulphide pigments, for instance, zinc sulphide, lithopone, other extended zinc sulphide pigments, such as calcium base lithopone, zinc sulphide extended with natural extenders, and the like, zinc oxide and antimony oxide, or barytes, china clay and diatomaceous.

The liquid hydrocarbon solvents in which the pigments are dispersed by the polymeric dispersing agent described hereinabove may be of aliphatic character, either acyclic or alicyclic, aromatic or naphthenic. Examples of individual hydrocarbons that may be employed include pentane, n-hexane, cyclohexane, n-heptane, n-octane, isooctane, benzene, toluene, xylene (o-, m-, or p-xylene). Commercially-available hydrocarbon mixtures may be employed such as mineral spirits, gasoline, xylene mixtures, terpenes, solvent naphthas of aromatic, aliphatic, or naphthenic character, alkyl benzenes in which the alkyl group or groups have from 1 to 4 carbon atoms, octane fractions which contain a mixture of octane isomers, and so on. Generally, it is preferred to employ a hydrocarbon liquid medium comprising at least 50% by weight of non-aromatic components, and especially those of aliphatic or paraffinic make-up. This preference has the advantage of lower cost.

In the final coating composition of lacquer or enamel type the ratio of pigment to the binder (binder including all film-forming polymeric material in the composition) is ordinarily between 1:100 to 1.5:1.

In the examples, the parts and percentages are by weight unless otherwise indicated.

Example 1

(a) A glass reaction vessel was provided with an agitator, a thermometer, inlet and outlet tubes for gas, reflux condenser, and a device for admitting reactants. The reaction vessel was heated with an oil bath. The vessel was swept with nitrogen and a slow current of gas was maintained during the entire polymerization cycle. A monomer mixture I was prepared in a separate vessel from 213.6 parts of lauryl-myristyl methacrylate, 15 parts of V.M. & P. naphtha (an aliphatic hydrocarbon solvent naphtha boiling in the range of 244° F. to 291° F.), and 1.5 parts of a 50% solution of diisopropylbenzene hydroperoxide.

Thirty percent of monomer mixture I was fed into the reaction vessel with 0.3 part of a n-hexanol solution containing 25% by weight of tert-octylphenoxyethoxyethylbenzyldimethyl ammonium chloride monohydrate. Within 20 minutes, polymerization had occured and the rest of monomeric mixture I was added during 100 minutes, maintaining a batch temperature of 105° C.

A monomer mixture II was prepared from 75 parts of methyl acrylate, 15 parts of maleic anhydride, and 0.45 part of a 50% solution of diisopropylbenzene hydroperoxide. This mixture was added to the reaction vessel (containing the copolymer of monomer mixture I) with 0.05 part of 25% solution of the above-noted quaternary ammonium chloride. Fom time to time, there was added small portions of diisopropylbenzene hydroperoxide solution and the above-noted quaternary ammonium solution diluted with naphtha. These incremental additions of the 50% hydroperoxide solution and of the same naphtha charged during the course of the copolymerization totalled 2.1 and 60 parts, respectively. The 25% quaternary ammonium chloride solution added amounted to 0.42 part. At 7.3 hours, the batch was diluted with 250 cc. of the same naphtha and at 8 hours, heating was stopped. There resulted 542 parts of solution which analyzed 46.7% of copolymer. When a portion of this product was diluted to 30% of copolymer, it showed a viscosity of 131.6 centistokes at 100° F.

(b) There was charged into a ball mill:

| | Parts |
|---|---|
| Titanium dioxide | 211 |
| Polymer dispersion [1] | 400 |
| Dispersion of part (a) (47%) | 23 |

[1] The polymer dispersion consisted of the product of Example 1 of U.S. Patent 3,198,759. This dispersion contained 48% solids and the polymer dispersed as insoluble particles in the mineral spirits (boiling over the range of 319 to 390° F.) medium of the dispersion was a copolymer of 50% methyl methacrylate and 50% ethyl acrylate polymerized in the medium containing about 26%, based on monomer weight, of an oil-modified alkyd resin.

The mixture was milled for 24 hours. The resulting paste was then blended with 290 parts of the same 48% polymer dispersion and then diluted to about 40% solids by adding 400 parts of naphtha.

(c) The composition obtained in part (b) had good stability (low tendency of pigment to settle and of enamel to increase in viscosity) and was applied to clean cold-rolled steel panels to provide a coating thickness (after drying) of about 2 mils thickness. After drying in air 10 minutes, the coated panels were baked 15 minutes at 300° F. The coatings had good adhesion and moderate gloss.

Example 2

(a) The procedure of Example 1(a) was repeated using as monomer mixture I:

| | Parts |
|---|---|
| Isobutyl methacrylate | 210 |
| 2-butoxyethanol | 30 |
| Diisopropylbenzene hydroperoxide (50%) | 1.5 |

and as monomer mixture II:

| | Parts |
|---|---|
| Methyl acrylate | 71 |
| Maleic anhydride | 15 |
| 2-butoxyethanol | 15 |
| Diisopropylbenzene hydroperoxide (50%) | 0.3 |

The product was a 47% solution of the copolymer. A 30% solution in 2-butoxyethanol of the copolymer obtained had a viscosity of 831.4 centistokes at 100° F.

(b) A coating composition was prepared as in Example 1(b) using 23 parts of the 47% dispersant polymer solution obtained in part (a) hereof in place of the dispersant dispersion of Example 1(a). The composition had good stability.

Example 3

(a) By the procedure of Example 1(a) a solution of a polymeric dispersant was prepared using as monomer mixture I:

150 parts of cetyl-stearyl methacrylate, prepared from a commercial alcohol mixture which analyzed 2% of tetradecanol, 30% of hexadecanol, and 68% of octadecanol.

84 parts of lauryl-myristyl methacrylate, prepared from mixed alcohols consisting of 4% n-decanol, 66.4% n-dodecanol, 27.2% n-tetradecanol, and 2.4% n-hexadecanol, 1.5 parts of diisopropylbenzene hydroperoxide (50%), and as monomer mixture II:

| | Parts |
|---|---|
| Methyl acrylate | 30 |
| Itaconic acid | 30 |
| Lauryl-myristyl methacrylate (as defined above) | 7.6 |
| Toluene | 55 |
| Diisopropylbenzene hydroperoxide (50%) | 0.34 |

and using toluene in place of the naphtha.

(b) A casting composition was prepared by the procedure of Example 1(b) using 45 parts of a 47% solution of the polymer obtained in part (a) hereof. Stable coating compositions were obtained.

(c) Parts (a) and (b) hereof were repeated except that the itaconic acid was replaced with the same amount of acrylic acid.

Example 4

(a) A random copolymer was prepared, using a polymerization vessel as described in Example 1(a), from a single monomeric mixture which was charged to the reactor during 2 hours, maintaining a batch temperature of 105–109° C. The monomeric mixture consisted of:

| | Parts |
|---|---|
| Isobutyl methacrylate | 150 |
| Lauryl-myristyl methacrylate (defined supra) | 61.2 |
| Methyl acrylate | 75 |
| Maleic anhydride | 15 |
| V.M. & P. naphtha | 15 |
| Diisopropylbenzene hydroperoxide (50% solution) | 1.95 |

The quantity of n-hexanol solution containing 25% of tert-octylphenoxyethoxyethylbenzyldimethyl ammonium chloride monohydrate charged with the original 30% of the above monomeric mixture was 0.48 part. Incremental additions of catalyst, activator, and solvent added during the copolymerization cycle totalled 2.1 parts of 50% solution of diisopropylbenzene hydroperoxide, 0.42 part of 25% solution of tert-octylphenoxyethoxyethylbenzyldimethyl ammonium chloride monohydrate, 90 parts of 2-butoxyethanol, and 195 parts of V.M. & P. naphtha. Heating was stopped at 7 hours. The cloudy viscous solution which resulted analyzed 47.0% copolymer which represented a 95.6% yield of copolymer based on the weight of the monomers charged. When a portion of this reaction product was diluted to 30% of copolymer, it showed a viscosity at 100° F. of 380.3 centistokes.

(b) A coating composition was prepared as in Example 1(b) using the dispersant polymer solution (47%) of part (a) hereof in place of the dispersion of Example 1(a). The composition had good stability. Coatings obtained therefrom as in Example 1(c) had good gloss and adhesion.

Example 5

(a) A reaction vessel was flushed with nitrogen and heated to 105° C. by means of an oil bath. A monomer mixture I was prepared consisting of 150 parts of isobutyl methacrylate inhibited with 200 p.p.m. of monomethyl ether of hydroquinone (MEHQ), 61.2 parts of lauryl-myristyl methacrylate, 15 parts of V.M. & P naphtha and 1.5 parts of diisopropylbenzene hydroperoxide (50%).

Thirty percent of monomer mixture I was fed into the reaction vessel with 0.3 part of a n-hexanol solution containing 25% by weight of tert-octylphenoxyethoxyethylbenzyldimethyl ammonium chloride monohydrate. Within 20 minutes, polymerization had occurred and the rest of monomeric mixture I was added during 10 minutes, maintaining a batch temperature of 105° C.

Meanwhile, a monomer mixture II was prepared from 75 parts of methyl acrylate, 15 parts of maleic anhydride, and 0.45 part of solution of diisopropylbenzene hydroperoxide (50%) solution. This mixture was fed into the reaction vessel concomitantly during 45 minutes with 0.09 part of n-hexanol solution, 25% of tert-octylphenoxyethoxyethylbenzyldimethyl ammonium chloride monohydrate. From time to time, there was added small portions of diisopropylbenzene hydroperoxide solution and the above-noted quaternary ammonium chloride solution diluted with 2-butoxyethanol and naphtha. These incremental additions totalled 2.1 parts of 50% solution of hydroperoxide, 0.42 part of 25% solution of the tert-octylphenoxyethoxyethylbenzyldimethyl ammonium chloride monohydrate, 130 parts of 2-butoxyethanol, and 180 parts of V.M. & P. naphtha. At 7.5 hours, the batch was diluted with 75 parts of 2-butoxyethanol and 15 parts of V.M. & P. naphtha and at 8 hours, heating was stopped. There resulted 617.3 parts of cloudy viscous solution which analyzed 44.3% of copolymer. A portion was diluted to 30% copolymer, and at 100° F., the viscosity was 987 centistokes.

(b) A coating composition was prepared by the procedure of Example 1(b) using 22 parts of the 44% polymer dispersion of part (a) hereof in place of the 47% dispersion of Example 1(b). The composition had good stability.

Coatings were prepared by the procedure of Example 1(c) and showed good gloss and adhesion.

Example 6

(a) A copolymer solution was prepared by the process of Example 5(a) except that the amounts of lauryl myristyl methacrylate and of isobutyl methacrylate in monomer mixture I were changed to 121 and 90 parts respectively.

(b) A coating composition was prepared by the procedure of Example 1(b) using 22 parts of the polymer dispersion obtained in part (a) hereof instead of the 47% dispersion of Example 1(b) and replacing the 48% polymer dispersion with 495 parts of the 38.7% dispersion of Example 2 of U.S. Patent 3,198,759 in which the insoluble polymer dispersed in octane is a copolymer of 60% ethyl acrylate, 20% methyl methacrylate, and 20% of acrylonitrile polymerized in the octane medium containing about 11%, on the weight of monomers used, of an oil-modified alkyd resin. The resulting composition had good stability and produced coatings on cold-rolled steel having good adhesion and gloss.

Example 7

(a) A copolymer solution was prepared by the process of Example 5(a) except that the amount of isobutyl methacrylate in monomer mixture I was changed to 180 parts and the methyl acrylate in monomer mixture II was replaced with 45 parts of ethyl acrylate.

(b) A coating composition was prepared by the procedure of Example 1(b) using 22 parts of the polymer dispersion obtained in part (a) hereof instead of the 47% dispersion of Example 1(b), replacing the 48% polymer dispersion with 750 parts of a 20% solution in a mixture of toluene and ethylene chloride (2 to 3 weight ratio) of a copolymer of 35% styrene, 25% methyl methacrylate, and 40% of n-butyl acrylate, and replacing the titanium dioxide with 250 parts of a mixture of calcium carbonate and iron oxide in proportions of 30 to 70 weight ratio.

Another composition was prepared in the same way except that instead of calcium carbonate and iron oxide, there was used 170 parts of the commercially available copper phthalocyanine designated Monastral Blue.

(c) Coatings on cold rolled steel and aluminum panels were made from the compositions of part (b) hereof by the procedure of Example 1(c). Good adhesion and gloss were obtained.

Example 8

(a) A copolymer solution was prepared by the process of Example 5(a) except that the isobutyl-methacrylate in monomer mixture I was replaced with a mixture of 140 parts of styrene, 20 parts of vinylidene chloride, and 20 parts of acrylonitrile, and the methyl acrylate in monomer mixture II was replaced with 25 parts of vinyl butyrate and 20 parts of methacrylamide.

(b) A coating composition was prepared by the procedure of Example 1(b) using 45 parts of a 47% solution of the polymer obtained in part (a) hereof. Stable coating compositions were obtained.

(c) Adherent, glossy coatings were obtained from the composition of part (b) hereof on panels of alkyd-primed steel, bare cold-rolled steel, and brass.

Example 9

Example 6 was repeated except that the 495 parts of 38.7% dispersion was replaced with 525 parts of a 41% solids dispersion in petroleum ether boiling between 80° C. and 100° C. of a coploymer, insoluble in the petroleum ether, of about 97.2% methyl methacrylate and 2.8% methacrylamide polymerized in the petroleum ether containing 2.8%, based on monomer weight, of crepe rubber and obtained by the process of Example 1 in United States Patent 3,095,388.

The composition had good stability and the coatings obtained were glossy and adherent.

Example 10

Example 6 was repeated except that the 495 parts of 38.7% dispersion was replaced with 580 parts of a 33% solids dispersion in a mixture of toluene and octane (15 to 185 weight ratio) of a copolymer, insoluble in the medium, of about 50% methyl methacrylate and 50% methyl acrylate obtained by the process of Example 8 of Canadian Patent 635,683.

The composition had good stability and the coatings obtained were glossy and adherent.

Example 11

Example 6 was repeated except that the 495 parts of 38.7% dispersion was replaced with 345 parts of a 55% solids dispersion in a solvent naphtha (boiling range 243–293° F.) of polymethyl acrylate insoluble in the naphtha obtained by the process of Example III of U.S. Patent 3,198,759. The composition obtained had good stability, and the coatings produced were glossy and adherent.

We claim:

1. A liquid/pigment/binder composition comprising a film-forming polymer dispersed in a liquid hydrocarbon medium, a pigment, and a dispersing agent for dispersing the pigment within the medium, said dispersing agent being an oil-soluble copolymer of monoethylenically unsaturated molecules containing 2 to 15% of a compound selected from the group consisting of low molecular weight monoethylenecially unsaturated acids and anhydrides and the balance, to make 100%, of essentially neutral monomers containing hydrocarbon groups imparting solubility in the hydrocarbon medium, at least 50% of said latter monomers having hydrocarbon groups having at least 12 carbon atoms, the relative proportion between the binder and the pigment being from 1:1.5 to 100:1 weight ratio, and the amount of dispersing agent being from about 2% to 15% by weight, based on the weight of pigment.

2. A composition comprising a suspension of a pigment in a liquid medium selected from hydrocarbons halogenated hydrocarbons, and mixtures thereof, and about 2% to 15% by weight, based on the weight of pigment, of a dispersing agent for the pigment comprising an oil-soluble copolymer of monoethylenically unsaturated molecules comprising 2 to 15% of at least one compound selected from the group consisting of low molecular weight of monoethylenically unsaturated acids and anhydrides and the balance, to make 100%, of essentially neutral monomers containing hydrocarbon groups imparting solubility in the aforesaid medium, at least 50% of said latter monomers having hydrocarbon groups having at least 12 carbon atoms.

3. A liquid/pigment/binder composition comprising a film-forming polymer dispersed in a liquid hydrocarbon medium, a pigment, and a dispersing agent for dispersing the pigment within the medium, said dispersing agent being an oil-soluble copolymer of monoethylenically unsaturated molecules containing 2 to 15% of a compound selected from the group consisting of low molecular weight monoethylenically unsaturated acids and anhydrides and the balance, to make 100%, of at least one ester of the Formula I

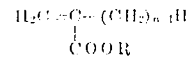

where $n$ is an integer having a value of 1 to 3, and R is a ($C_1$–$C_{18}$)alkyl group, at least 50% of the units formed of Formula I ester molecules having R groups of at least 12 carbon atoms, the relative proportion between the binder and the pigment being from 1:1.5 to 100:1 weight ratio, and the amount of dispersing agent being from about 2% to 15% by weight, based on the weight of pigment.

4. A composition comprising a suspension of a pigment in a liquid medium selected from hydrocarbons, halogenated hydrocarbons, and mixtures thereof, and about 2% to 15% by weight, based on the weight of pigment, of a dispersing agent for the pigment comprising an oil-soluble copolymer of monoethylenically unsaturated molecules comprising 2 to 15% of at least one compound selected from the group consisting of acrylic, methacrylic acid, itaconic acid, aconitic acid, maleic acid, fumaric acid and the anhydrides thereof, and the balance, to make 100%, of at least one ester of the Formula I

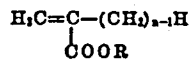

where $n$ is an integer having a value of 1 to 3, and R is a ($C_1$–$C_{18}$)alkyl group, at least 50% of the units formed of Formula I ester molecules having R groups of at least 12 carbon atoms, 5. A liquid/pigment/binder composition comprising a film-forming polymer dispersed in a liquid hydrocarbon medium, a pigment, and a dispersing agent for dispersing the pigment within the medium, said dispersing agent being an oil-soluble copolymer of monoethylenically unsaturated molecules containing 2 to 15% of maleic anhydride and the balance, to make 100%, of at least one ester of the Formula I

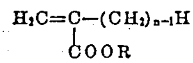

where $n$ is an integer having a value of 1 to 3, and R is a ($C_1$–$C_{18}$)alkyl group, at least 50% of the units formed of Formula I ester molecules having R groups of at least 12 carbon atoms, 6. A composition comprising a suspension of a pigment in a liquid medium selected from hydrocarbons, halogenated hydrocarbons, and mixtures thereof, and about 2% to 15% by weight, based on the weight of pigment, of a dispersing agent for the pigment comprising an oil-soluble copolymer of monoethylenically unsaturated molecules comprising 2 to 15% of maleic anhydride and the balance, to make 100%, of at least one ester of the Formula I

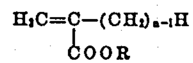

where $n$ is an integer having a value of 1 to 3, and R is a ($C_1$–$C_{18}$)alkyl group, at least 50% of the units formed of Formula I ester molecules having R groups of at least 12 carbon atoms.

References Cited

UNITED STATES PATENTS

| | | | |
|---|---|---|---|
| 3,166,524 | 1/1965 | Schmidle et al. | 260—33.6 |
| 2,913,437 | 11/1959 | Johnson | 260—78.5 |
| 3,249,455 | 5/1966 | Williams | 106—309 |

ALLAN LIEBERMAN, *Primary Examiner.*

R. S. BARON, *Assistant Examiner.*